Dec. 20, 1955  W. F. LEINEWEBER, JR  2,727,279
MEANS FOR PREVENTING MALFUNCTIONING OF AUTOMATIC BLENDING SYSTEM
Filed Dec. 17, 1951  3 Sheets-Sheet 1
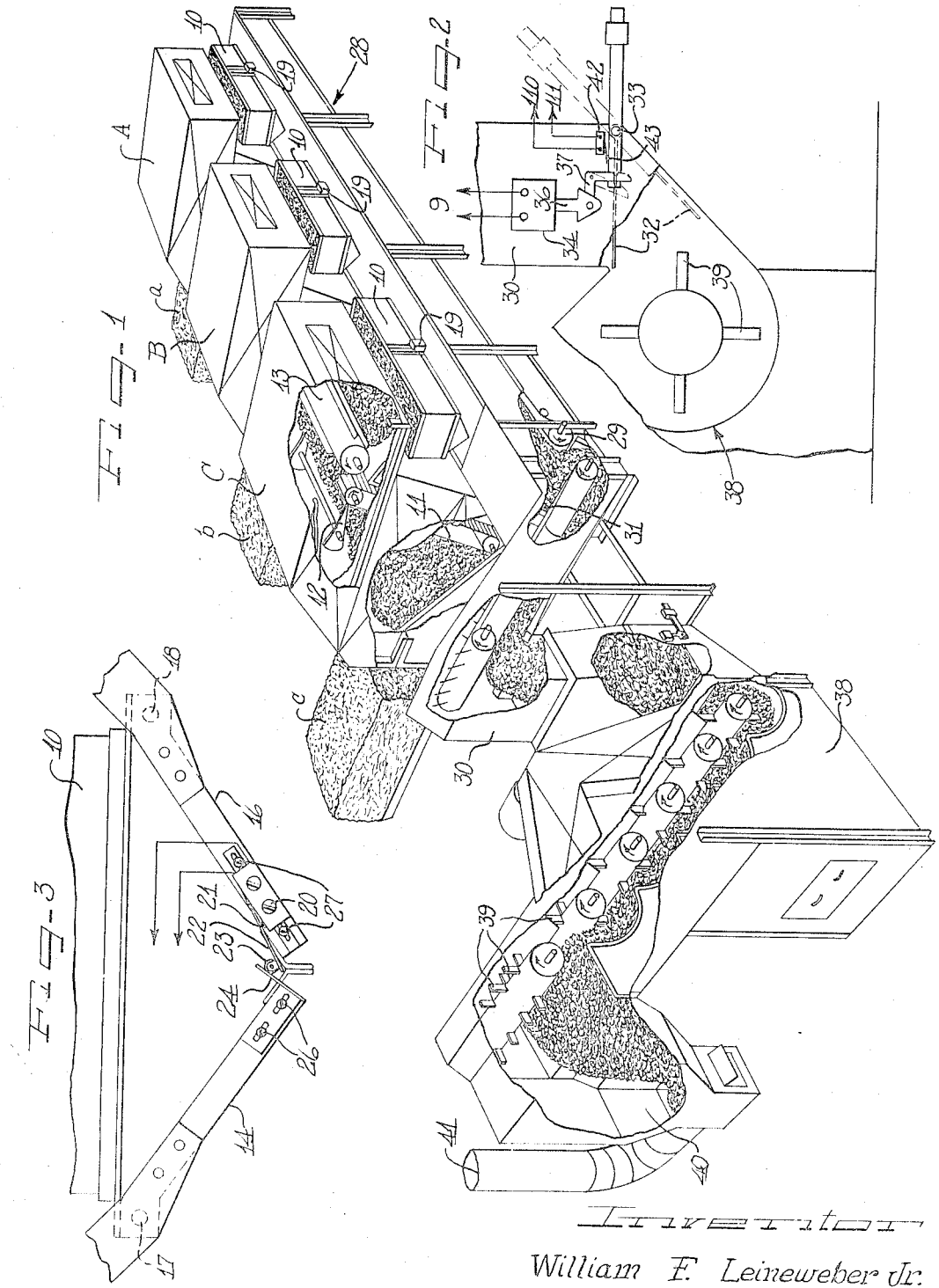
Inventor
William F. Leineweber Jr.

Dec. 20, 1955 W. F. LEINEWEBER, JR 2,727,279
MEANS FOR PREVENTING MALFUNCTIONING OF AUTOMATIC BLENDING SYSTEM
Filed Dec. 17, 1951 3 Sheets-Sheet 2

Inventor
William F. Leineweber Jr.

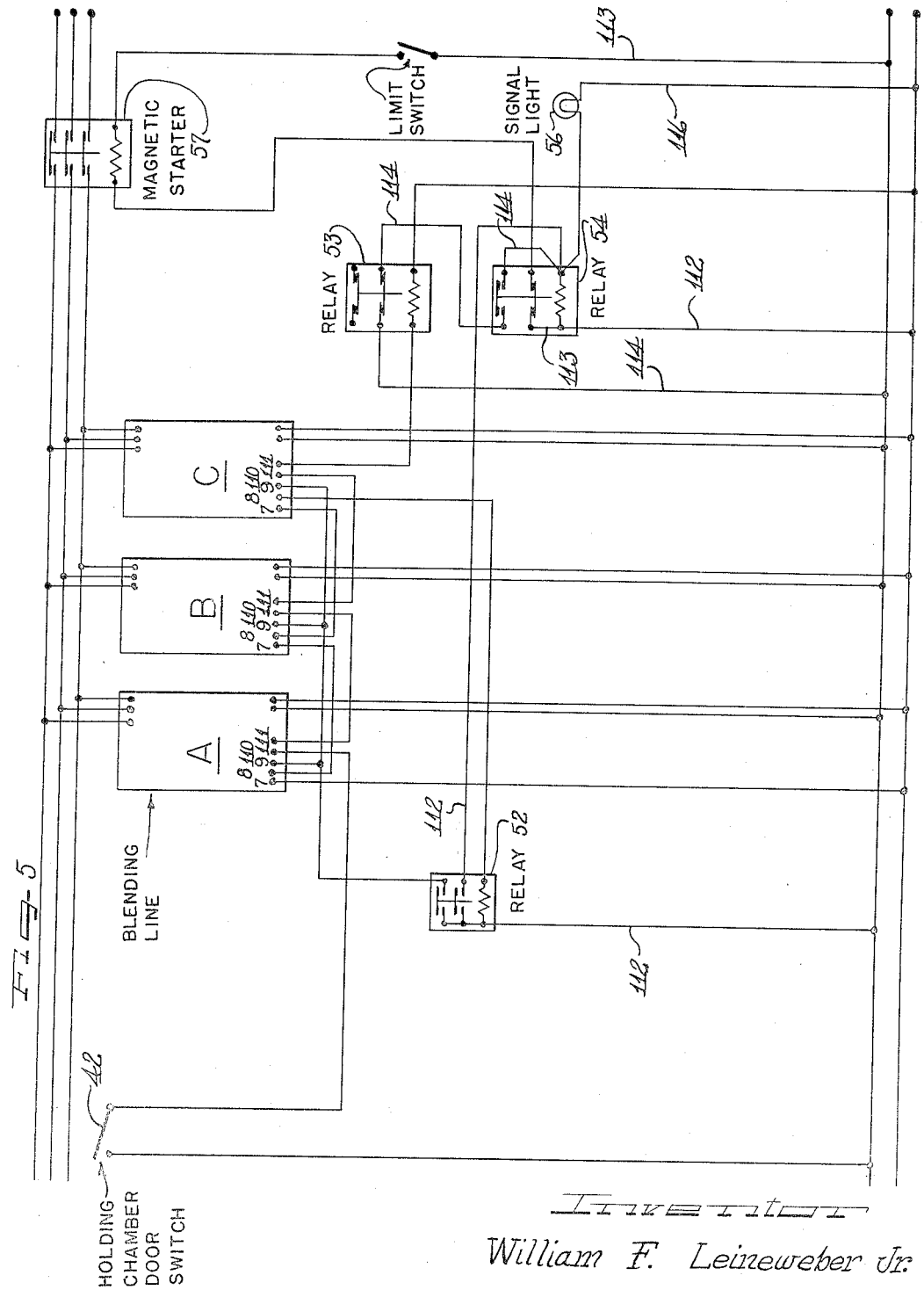

United States Patent Office 2,727,279
Patented Dec. 20, 1955

2,727,279

MEANS FOR PREVENTING MALFUNCTIONING OF AUTOMATIC BLENDING SYSTEM

William F. Leineweber, Jr., Greenville, S. C., assignor to W. D. Dodenhoff Co., Inc., Greenville, S. C., a corporation of South Carolina Application December 17, 1951, Serial No. 262,154

14 Claims. (Cl. 19—69)

This invention relates generally to fiber preparation and more particularly to a method and system for preventing malfunctioning of an automatic blending system used to obtain a uniform homogeneous mixture of different types of textile fibers.

According to the general principles of the present invention, a plurality of fiber feeding and weighing machines are arranged in battery to automatically and continuously weigh small increments of different types of fibers. A common holding chamber is provided and a conveyor means is situated between each of the machines and the common holding chamber. Control means in control of each of the machines regulates the concurrent discharge of all of the increments to the conveyor means whereupon the different lots of fibers are delivered to the common chamber and a single sandwiched package is formed in the chamber. Each package is separately mixed in a blending machine and the mixed packages are continuously delivered to the picker room for subsequent operations.

Since it is frequently necessary that each individual machine in the battery line proportion a different quantity of fibers, means are provided to stop the automatic feeding of fibers to the particular weighing hopper as soon as the necessary accumulation of fibers has been obtained. Means are also provided to concurrently discharge all of the accumulated fibers in all of the machines simultaneously as soon as the last machine in the line has accumulated the required quantity of fibers.

As soon as all of the individual lots of fibers have been discharged, all of the weighing hoppers are again reset and the automatic feeding means is restarted to initiate a new cycle of accumulation.

The holding chamber of the apparatus thus far described is also provided with a motor controlled discharge means which is preferably operated concurrently with the discharge of fibers from the individual weighing hoppers.

A particular feature of the present invention lies in the provision of control means interconnecting the control components of the system so that the automatic feeding mechanism of the system will be rendered inoperative unless proper resetting occurs. Thus, if for any reason one of the machines is not properly reset after a discharge operation, the other machines in the battery or blending line will not be permitted to continuously repeat their cycle. It is extremely important, of course, that all machines of the blending line deliver a certain proportion or percentage of the aggregate blend when a plurality of different types of fibers are being mixed together and any malfunctioning of even a single machine would completely nullify or destroy the blend.

It is an object of the present invention, therefore, to provide a means for preventing malfunctioning of an automatic blending system.

Another object of the present invention is to insure accurate proportioning in the mixing of an aggregate blend of different types of fibers.

Many other features, advantages and additional objects of the present invention will become manifest to those versed in the art upon making reference to the detailed description which follows and the accompanying sheets of drawings in which a preferred embodiment constructed in accordance with the principles of the present invention is shown by way of illustrative example.

On the drawings:

Figure 1 is a schematic diagram of an automatic blending system according to the principles of the present invention;

Figure 2 is a somewhat diagrammatic fragmentary elevational view with parts broken away and with parts shown in phantom illustrating additional structural provisions of the present invention in regard to the automatic holding chamber provided in the blending system of Figure 1;

Figure 3 is a fragmentary elevational view with parts broken away showing additional structural provisions of the present invention particularly in regard to the door switch cooperating with the discharge doors of the weighing hopper on each fiber feeding machine;

Figure 5 is a circuit diagram showing the external wiring of the blending system of Figure 1.

As shown on the drawings:

Figure 4:
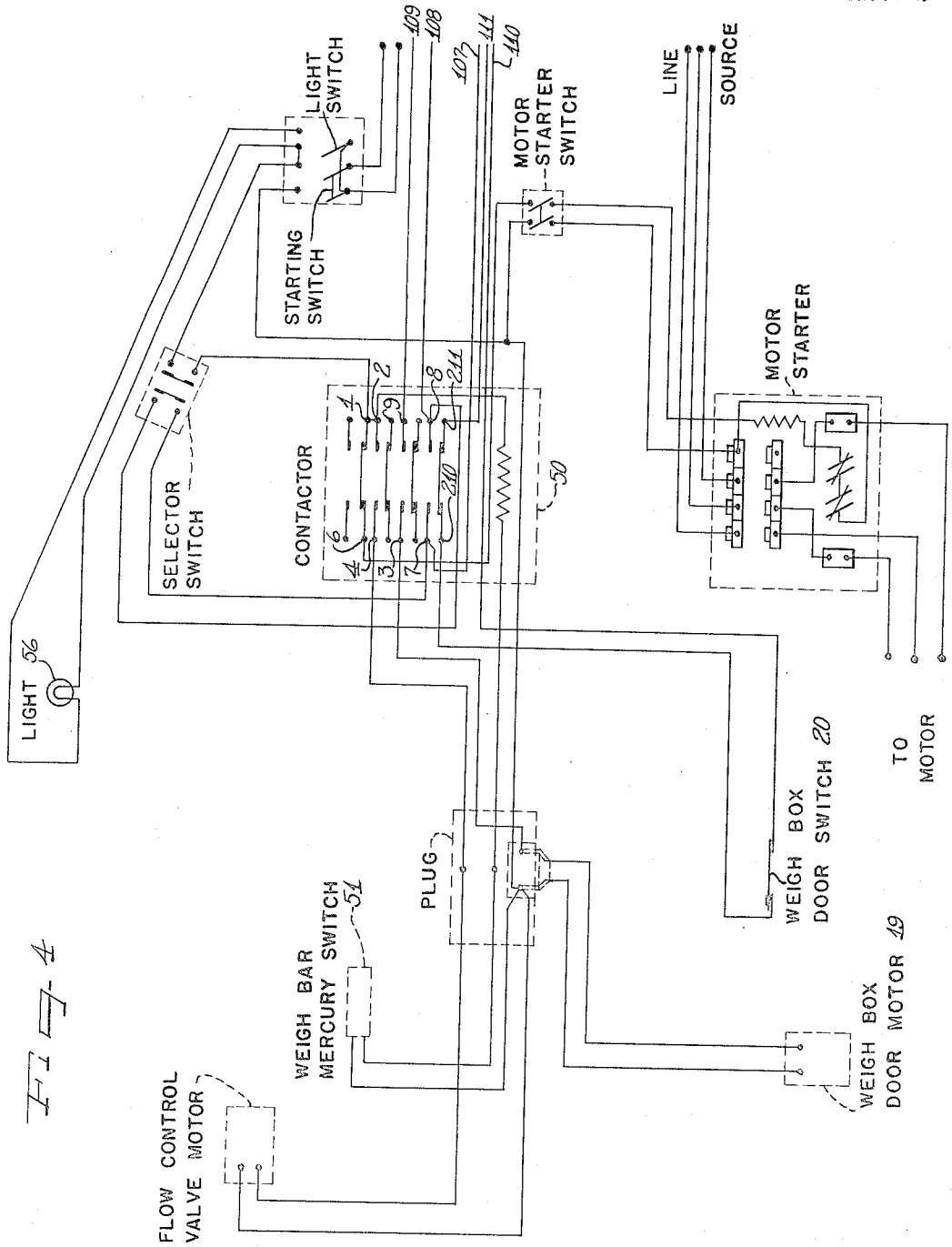
Figure 4 is a circuit diagram showing the internal wiring of each individual fiber feeding machine employed in the blending system of Figure 1.

The system provided in accordance with the principles of the present invention contemplates the provision of a plurality of fiber feeding and weighing machines indicated on Figure 1 by the reference characters A, B and C, respectively, there being one fiber feeding and weighing machine for each type of fiber to be blended in order to obtain a given mix of fibers to produce cloth of a desired texture.

Behind each of the machines A, B and C is shown a bale of fibers indicated by the reference characters a, b and c. It will be understood that portions of each of the bales a, b and c are lowered into the machines A, B and C for opening and fluffing the fibers.

Each of the machines A, B and C is provided with an automatically controlled weighing system including an accumulating hopper or weighbox 10 located subjacent a discharge opening controlled by a motor-actuated valve forming part of a motor-operated feeding means so that predetermined increments of fiber stock may be automatically and accurately supplied to each of the accumulating hoppers or weighboxes 10. In the machine indicated at C, the walls are broken away to reveal some of the internal operating mechanism and it will be noted that each of the feeding machines includes an endless belt spiked apron 11 which carries fibers upwardly past a comb 12 whereupon the fibers are loosened from the apron 11 by the blades of a doffer 13.

When the motor-actuated valve is open, the fibers pass through the discharge opening and into the accumulating hopper or weighbox 10.

It will be understood that feeding of the fibers into the weighbox 10 may be stopped by actuating the motor-operated feeding mechanism. In other words, the motor-actuated valve may be closed whereupon the fibers will be recirculated by the apron 11, or in the alternative, the main drive motor (not shown) conventionally provided to power the apron 11, the comb 12 and the doffer 13 may be stopped, or yet another alternative, the main drive motor may be stopped and the motor-actuated valve concurrently operated without effecting recirculation so that the motor-actuated valve merely prevents an overrun feed of fibers while the main drive motor is being stopped.

Each accumulating hopper or weighbox 10 is further provided with a hopper door construction shown in greater detail in Figure 3. A hopper door 14 and a hopper door 16 are mounted for selective angular displacement around a pivot axis 17 and a pivot axis 18, respectively. The hopper doors 14 and 16 preferably form the bottom of the accumulating hopper or weighbox 10 so as to control the accumulation of fibers in the box 10 and the subsequent discharge of the fibers therefrom. The hopper doors 14 and 16 are motor-controlled by a suitable prime mover shown by way of illustrative example in Figure 1 as comprising a solenoid motor 19.

There is provided on each accumulating hopper or weighbox 10 a switch mechanism having relatively movable components which may be positioned to be indicative of the position of the hopper doors 14 and 16. In Figure 3, the switch mechanism is indicated at 20 and includes an actuating member 21 engaging a lever arm 22 having a roller 23 on the end thereof which is adapted to be engaged by a stop member 24. The switch 20 is shown mounted on the hopper door 16 while the stop member 24 is carried by the hopper door 14. The stop member 24 may be adjusted on the hopper door 14 by virtue of a screw and slot connection indicated at 26 and the switch 20 may be adjustably positioned on the hopper door 16 by a screw and slot connection indicated at 27, thereby permitting relative adjustment to be made so that the switch 20 will be actuated to a desired position whenever the hopper doors 14 and 16 are fully closed as shown in Figure 3. A pair of conductor wires 20a are shown connected to the switch 20 and comprise the circuit means which are adapted to be controlled thereby.

A continuously fast moving conveyor 28 is provided and includes an endless belt 29 arranged to convey fibers discharged by each machine A, B and C to an automatic holding chamber 30. The conveyor mechanism 28 preferably includes an inclined conveyor 31 by means of which the individual increments discharged by each of the machines A, B and C may be elevated and deposited in the automatic holding chamber 30.

Each individual increment drops on top of the preceding increment within the automatic holding chamber 30 to form a sandwich. The sandwiching action produces a layered package which rests on a discharge door 32 forming a movable bottom wall for the holding chamber 30 (Figure 2). The door 32 is shown hinged around pivot axis 33 and may be powered by a suitable prime mover 34 which, in the embodiment of Figure 2, takes the form of a solenoid having a movable plunger 36 connected to one arm of a crank 37, the other end of which latches the counterweighted door 32. Thus, upon actuation of the solenoid plunger 36 the door 32 may be moved from the full line position shown in Figure 2 to the dotted line position by the weight of the fiber package whereupon the package will pass from the automatic holding chamber 30 into a blending machine 38 wherein each package is separately mixed by a plurality of beaters 39. The mixed blend is discharged to a common outlet 40 for delivery through a discharge pipe 41 to the picker room wherein the loose blended stock is received and subsequently formed into a lap, or rolled blanket of uniform width and length.

A switch 42 is shown mounted on the automatic holding chamber 30 and has an actuating element 43 arranged to be engaged by the door 32, the switch 42 thereby indicating the relative position of the door 32. A pair of suitable conductors are shown connected to the switch 42 and comprise circuit means adapted to be controlled by the switch 42.

In operating mechanism of the type thus far described, the door motors 19 will sometimes fail. Under ordinary circumstances, the failure of the motors 19 would have no effect on the accumulating hopper or weighbox 10 receiving the fibers, however, if the door motor is inoperative, it will be evident that the fibers will not be properly discharged and the particular machine with which the motor failure is associated will not be contributing its proportional share of fibers to the blending line.

Another operational failure which might occur is the breaking of the suspension means by which the accumulating hopper or weighbox 10 is pendulously suspended subjacent the discharge opening of each of the feeding machines. Such failure would destroy the equilibrium of the weighing system balance whereupon the particular machine in question would fail to operate.

If the weight of fiber to be collected in the accumulating hopper or weighbox 10 is very small, there may be a critical balance whereby the automatic weighing system will not function properly. Thus, the control devices which respond to the quantity of fibers accumulated in the accumulating hopper or weighbox 10 may be rendered inoperative. In each of these instances enumerated above, the malfunctioning machine will not deliver its required proportion or percentage of aggregate blend and as a result, the blend will be nullified or destroyed as long as the malfunctioning is permitted to exist. It will be understood that even a single cycle of operation under a malfunctioning condition is likely to result in the ruination of many yards of subsequently woven fabric.

Another type of malfunctioning which may occur should also be mentioned. The hopper doors 14 and 16 may be prevented from closing completely by virtue of a lint accumulation on the door hinge rod bearings or spring failure. If such condition occurs, the fibers being fed by the particular feeding machine may sift through the opening between the hopper doors 14 and 16 and will malproportion the aggregate blend.

In accordance with the principles of the present invention, all of the dangerous effects resulting from the malfunctions described are eliminated by an electrical control circuit which will now be described in greater detail.

Figure 4 shows circuits 110 and 111 in the internal wiring circuit of an individual fiber feeding and weighing machine such as any of the machines A, B and C shown in Figure 1. This circuit is shown connected across contactor points 210 and 211 contained within a contactor 50. The switch 20 on the accumulating hopper or weighbox 10 is connected in the circuits 110 and 111 in series and must be closed for the circuit to be closed. Thus, the switch 20 is so mounted on the hopper doors 14 and 16 so that it is necessary for the hopper doors 14 and 16 to be completely closed in order to close the switch.

The automatic weighing system for each of the fiber feeding and weighing machines A, B and C is provided with a mercury switch responsive to the position of the weighbar mechanism, the automatic weighing mechanism comprising a conventional beam balance type of scale unit. In Figure 4, the weighbar mercury switch is indicated by the reference numeral 51.

The contactor points 210 and 211 are closed when the mercury switch 51 is open. The mercury switch 51, in turn, is opened when the accumulating hopper or weighbox 10 is in the up position and is closed when the box 10 is in the down position, the up position corresponding to an empty condition of the box 10 and the down position corresponding to a filled condition of the box 10.

Before proceeding further with the description of the internal wiring circuit shown in Figure 4, attention is invited to the external wiring circuit for the blending system shown in Figure 5. There is provided in the external system a first relay indicated at 52, a second relay indicated at 53 and a third relay indicated at 54, as well as a signal light 56.

Referring now to Figure 4 in connection with Figure 5, it will be noted that the circuits 110 and 111 connects the machines A, B and C in series, the relay 53 also being connected in series within this circuit.

What shall be referred to herein as a "setting circuit" is indicated at 112 and runs across a set of connector points in the relay 52 and also runs through the operating coil of the relay 54.

What is referred to herein as a "master motor starter coil circuit" is indicated at 113 and runs through the operating coil of a magnetic starter 57 and across a set of points in the relay 54. A limit switch 58 is provided in the master motor starter coil circuit 113 to stop the blending line when sufficient quantity of blended aggregate has been delivered to the picker room, for example, the limit switch 58 may be operated when the picker hopper is filled with stock, thereby preventing overfeeding.

What is referred to herein as a "holding circuit" is indicated at 114 and runs across the connector points in the relay 53 and the relay 54.

What is referred to herein as a "signal light circuit" is indicated at 116 and it will be noted that this circuit is provided in parallel across the holding circuit 114 at the operating coil of the relay 54.

It may be noted that all of the relays 52, 53 and 54 are shown in the drawing in their de-energized positions.

In order to describe the action of the various circuits and the operating effects obtained thereby, various phases occurring during a typical operating sequence will be described.

In the first phase of operation, all of the accumulating hoppers or weighboxes 10 are in their up position ready to receive fiber and all of the hopper doors 14 and 16 are closed. The control circuit 110 and 111 is completed and the relay 53 is energized. During this phase of operation, the relays 52 and 54 will be de-energized and the master motor starter will be energized so that the motor-actuated feeding means are supplied with current. In connection with the description of the present control mechanism, it will be assumed that the master motor is deenergized whenever it is necessary to stop feeding fibers into the accumulating hopper or weighbox 10, however, it will be understood that this particular example is not to operate as a limitation insofar as other means of stopping the feeding operation is concerned.

In the second phase of operation, it will be assumed that one of the machines has delivered the required proportion of fibers into its accumulating hopper or weighbox 10. The box 10 having received its predetermined quantity of fibers, the switch 51 will be closed so that the operating coil of the contactor 50 will be energized. In the contactor 50, the contact points 7 and 8 will be closed, thereby closing a part of the 107 and 108 circuits. The contactor points 3 and 9 would also be closed, thereby energizing a part of a dumping circuit 109. The contact points 210 and 211 will be opened, thereby de-energizing relay 53 and partially closing the holding circuit 114. A similar action will occur with respect to each individual machine in the blending line including the machines A, B and C.

The third phase of operation occurs when the last machine in the blending line accumulates the required proportion of fibers in the accumulating hopper or weighbox 10 whereupon the entire protective circuit provided in accordance with the principles of the present invention takes effect. In order of sequence, the relay 52 is energized by completion of the 107 and 108 circuits. This closes the dumping circuit 109 whereupon all of the door motors 19 will be energized and the accumulating hopper or weighboxes 10 will discharge their fibers. The relay 54 will be energized by the setting circuit 112 through the relay 52 whereupon the master motor starter circuit 113 is broken and the current to all of the main operating motors for the various machines A, B and C is cut off. In this phase, the holding circuit already partially completed by the relay 53 is fully completed so that the signal light 56 connected in parallel thereacross will be energized.

In the fourth phase of operation, the accumulating hoppers or weighing boxes 10 having discharged their respective weights of fibers, the switches 51 will be opened so that the 107 and 108 series circuits will be broken, thereby de-energizing the relay 52. At the same time, the dumping circuit 109 will be broken, thereby permitting the hopper doors 14 and 16 to close and the setting circuit 112 to relay 54 will also be broken. It will be noted, however, that the relay 54 remains energized through the holding circuit 114 so all other conditions prevail as at the end of the third operational phase.

As soon as the hopper doors 14 and 16 of the last machine have been closed, the fifth phase of operation occurs. The series control circuits 110 and 111 are again closed so that the relay 53 is energized, the holding circuit 114 is broken and the relay 54 is de-energized. In this phase, the master motor starter circuit 113 is again closed and the cycle will repeat its normal operation. The signal light 56 will also be de-energized.

If any malfunctioning occurs, however, the sixth phase of operation takes place. For example, if one of the accumulating hoppers or weighboxes 10 fails to reset the switch 51 associated therewith, or if the hopper doors 14 and 16 on any of the weighboxes 10 fail to close properly so that the door switches 20 are not fully closed, the series control circuits 110 and 111 will remain open and the entire blending line will be placed in a condition corresponding to the end of the fourth phase of operation.

It will be further noted that if the door 32 on the automatic holding chamber 30 fails to return to its normal position after discharging the sandwich of fibers into the blending machine 38, the switch 42 (Figure 5) will remain open. This switch 42 is in series in the 110 and 111 circuits and must be closed before the blending line can be restored to normal operation.

Although various minor modifications might be suggested by those versed in the art with regard to the preferred embodiment herein described by way of illustrative example, it should be clearly understood that I wish to embody within the scope of the patent warranted hereon all such modifications as reasonably and properly come within the scope of my contribution to the art.

I claim as my invention:

1. A fiber blending system comprising, a plurality of fiber blending machines arranged in battery to automatically and continuously proportion increments of different types of fibers, there being one machine for each type of fiber, each machine having a door control hopper to accumulate a predetermined quantity of fibers, control means for said machines to simultaneously actuate all of said hoppers into a discharge condition for concurrently discharging each of said increments and into a closed position to resume proportioning, and means automatically actuated by said hoppers for rendering all of said machines inoperative when any one of said hoppers remains in a discharge condition.

2. A fiber blending system comprising, a plurality of fiber feeding machines arranged in battery to automatically and continuously accumulate proportional increments of different type of fibers, there being one machine for each type of fiber, electric actuating means for said machines to simultaneously actuate all of said machines into a discharge condition upon all of said machines accumulating their proportional increments and into an accumulating condition to resume norml proportioning, circuit means for energizing said electric actuating means, and electric control means actuated by said fiber accumulating means for rendering all of said machines inoperative when any one of said machines remains in a discharge condition.

3. A fiber blending system comprising, a plurality of fiber feeding machines arranged in battery, a weighing hopper for each machine having electrically actuated discharge means, each of said machines having electrically controlled feeding means to feed fibers into a corresponding one of said hoppers, control means for said machines to simultaneously operate and reset all of said discharge means, and electrical means automatically actuated by said hoppers for rendering all of said feeding means inoperative when any one of said discharge means fails to reset.

4. The method of blending a plurality of different kinds of fibers with a fiber blending system including a battery of machines having electrically controlled feeding means and electrically controlled accumulator means, which includes the steps of separately feeding a predetermined quantity of one of a plurality of different kinds of fibers to a fiber accumulating station, separately stopping each feeding means as the corresponding predetermined quantity of fibers is accumulated, concurrently opening all of the accumulator means upon all of the machines having accumulated the corresponding predetermined quantities of fibers to simultaneously discharge all of the fibers, concurrently resetting all of the accumulator means, and concurrently and automatically starting all of the feeding means after all of the accumulator means have been reset.

5. A fiber blending system comprising, a plurality of fiber feeding machines arranged in battery, an accumulating hopper for each machine, feeding means for each machine to supply fibers to the accumulating hopper, discharge means for each hopper, control means to stop each feeding means separately upon accumulating a predetermined quantity of fibers in the corresponding hopper, control means to simultaneously actuate all of said discharge means upon the last machine in the battery having accumulated its predetermined quantity of fibers in the corresponding hopper, and control means to reset all of said discharge means and restart all of said feeding means, said last mentioned control means including an electric circuit associated with all of said discharge means and operative to render all of said feeding means inoperative in the event one of said discharge means is not reset.

6. A fiber blending system comprising a plurality of fiber feeding machines arranged in battery, an accumulating hopper for each machine, a feeding means for each machine to supply fibers to the hopper, discharge means for each accumulating hopper, control means to separately stop each feeding means upon accumulating a lot comprising a predetermined quantity of fibers in the corresponding hopper, conveyor means to receive the discharged lots, a holding chamber receiving the lots from the conveyor means to form a single package of fibers, discharge means for the holding chamber, a blending means receiving the package discharged from the holding chamber, control means to simultaneously actuate said hopper discharge means and said holding chamber discharge means, control means to substantially concurrently reset all of said discharge means and restart all of said feeding means, said last mentioned control means including means associated with said hopper discharge means and said chamber discharge means to render all of said feeding means inoperative in the event any one of said discharge means fails to reset.

7. A fiber blending system comprising a plurality of fiber feeding machines arranged in battery, an accumulating hopper for each machine, a motor controlled feeding means on each machine to supply fibers to the corresponding hopper, a motor controlled door forming the bottom of each hopper, a control device for each hopper responsive to the quantity of fibers accumulated therein to regulate the corresponding motor controlled feeding means, control means interconnecting all of said control devices to simultaneously open all of said motor controlled doors after all of said hoppers have accumulated predetermined quantities of fibers, and control means to close all of said doors and start all of said feeding means, said last mentioned control means including interconnected circuit means having a door actuated switch on each hopper therein, wherein said feeding means is rendered inoperative unless all of said doors are closed.

8. A fiber blending system comprising a plurality of fiber feeding machines arranged in battery, an accumulating hopper for each machine, a motor controlled feeding means on each machine to supply fibers to the corresponding hopper, a motor controlled door forming the bottom of each hopper, a control device for each hopper responsive to the quantity of fibers accumulated therein to regulate the corresponding motor controlled feeding means, control means interconnecting all of said control devices to simultaneously open all of said motor controlled doors after all of said hoppers have accumulated predetermined quantities of fibers, conveyor means to receive the discharged fibers, a holding chamber receiving the fibers from the conveyor means to form a single package of fibers, discharge means for the holding chamber, a blending means receiving the package discharged from the holding chamber, said control means interconnecting all of said control devices being connected to said discharge means for the holding chamber to simultaneously discharge the package from the holding chamber concurrently with the discharge of fibers from the accumulating hoppers, control means to reset all of said discharge means and restart all of said feeding means, said last mentioned control means including means associated with said motor controlled doors and said chamber discharge means to render all of said feeding means inoperative in the event any one of said doors or said discharge means fails to reset.

9. A control system for a fiber blending line of the type including a plurality of fiber feeding machines arranged in battery and each having an accumulating hopper, comprising, a feeding motor for each machine to control the feeding mechanism of each machine, a door motor for each machine to control the discharge of fibers from each hopper, a condition sensitive switch to control each respective door motor in response to the quantity of accumulated fibers, circuit means interconnecting all of said switches to simultaneously energize all of said door motors after all of said switches have been actuated, and an electric circuit interconnecting said door motors and said feeding motors to restore the door motors and restart the feeding motors and including switches actuated by the doors associated with the respective door motors, to render all the feeding motors inoperative in the event that any of the door switches is not reset.

10. Means for blending a plurality of different fibers together comprising a plurality of fiber handling machines, fiber receiving means associated with each of the fiber handling machines for receiving and holding fibers discharged from each machine, means operable by the weight of the fibers in the receiving means for stopping the discharge of each machine when a predetermined amount of fibers have been collected in the fiber receiving means, means automatically operable for discharging the fibers from all of the fiber receiving means when all of the receiving means have been charged with their predetermined weights of fibers, means for resetting each of the fiber receiving means to receive and hold additional fibers, and control means rendering all of said machines inoperative in the event one of said fiber receiving means is not reset, said control means including an electrical circuit having switches actuated respectively when the associated receiving means are reset.

11. A fiber blending apparatus comprising a plurality of fiber preparation machines, each having individual means for driving the same and each having a discharge opening, a fiber receiving container disposed below each of said discharge openings for receiving the fibers discharged from the machines, means operable by the weight of the fibers in each container associated with each machine for stopping the discharge of fibers into the container associated with the machine when a predetermined weight of fibers is received into the container, means automatically operable when all of the containers have received their predetermined weight of fibers therein for automatically discharging the fibers from the containers, means for resetting each of the fiber receiving means for repeating the cycle, and control means for rendering all of said machines inoperative in the event one of said fiber receiving means is not reset, said means including an electrical circuit having switches for each of said receiving means which are automatically actuated coincident with resetting of the receiving means associated therewith.

12. Apparatus for conditioning fibers comprising a plurality of fiber preparation machines, each machine having a discharge opening, a container disposed below each of the openings and adapted to receive fibers passing through the machine, means operable by the weight of the fibers in a container when a predetermined weight of fibers is deposited into the container for automatically stopping the discharge of the fibers into the particular container, means automatically operable when all of the containers are charged with predetermined amounts of fibers for automatically discharging all of the fibers from all of the containers and for again activating all of the machines for the reception of additional batches of fibers, and control means rendering all of said machines inoperative if one of the machines remains inactivated, said means including an electrical circuit having switches for each of said receiving means which are automatically actuated coincident with resetting of the receiving means associated therewith.

13. Fiber preparation machinery comprising a plurality of fiber processing machines, each having a discharge opening from whence the fibers are discharged, each opening having a container disposed therebelow and each container being provided with a swingable bottom member, means automatically operable when a predetermined poundage of fibers has been deposited in a container for stopping the discharge of fibers into that container and means automatically operable when all of the containers have been filled with a predetermined poundage for automatically moving all of the swingable bottoms and discharging the fibers simultaneously from all of the containers, means automatically operable after the fibers have been discharged from all of the containers for closing the bottoms of the containers ready for the reception of additional batches of fibers, and means operable automatically when the fibers are dumped and the bottoms of all the containers have been closed for again discharging fibers into the containers, said last mentioned means including an electrical circuit having switches therein for each of said machines, which switches are actuated to closed position for renewed operation of said machines by the conditioning of said machines for reception of additional batches of fibers.

14. Apparatus for blending fibers comprising a plurality of fiber processing machines, each having a discharge outlet, a container disposed below each of the discharge outlets for catching and retaining the fibers passing through each machine, means controlled by the weight of fibers in a container for stopping the discharge fibers into the container when a predetermined weight of fibers is deposited in the container, and means automatically operable when all of the containers have their predetermined weight of fibers deposited therein for automatically discharging the fibers from the containers and for resetting the machines to repeat the operating cycle, and electrical control means for rendering all of said machines inoperative in the event any one of said fiber processing machines is not reset to receive additional fibers including switches actuated by the resetting of the several machines.

References Cited in the file of this patent

UNITED STATES PATENTS

| | | |
|---|---|---|
| 1,364,003 | Smith | Dec. 28, 1920 |
| 1,630,375 | Curley | May 31, 1927 |
| 2,073,652 | Robb | Mar. 16, 1937 |
| 2,113,988 | Kershaw | Apr. 12, 1938 |
| 2,252,589 | Whitmore | Aug. 12, 1941 |
| 2,328,675 | Ribbans | Sept. 7, 1943 |
| 2,412,506 | Greene et al. | Dec. 10, 1946 |